Patented Nov. 10, 1953

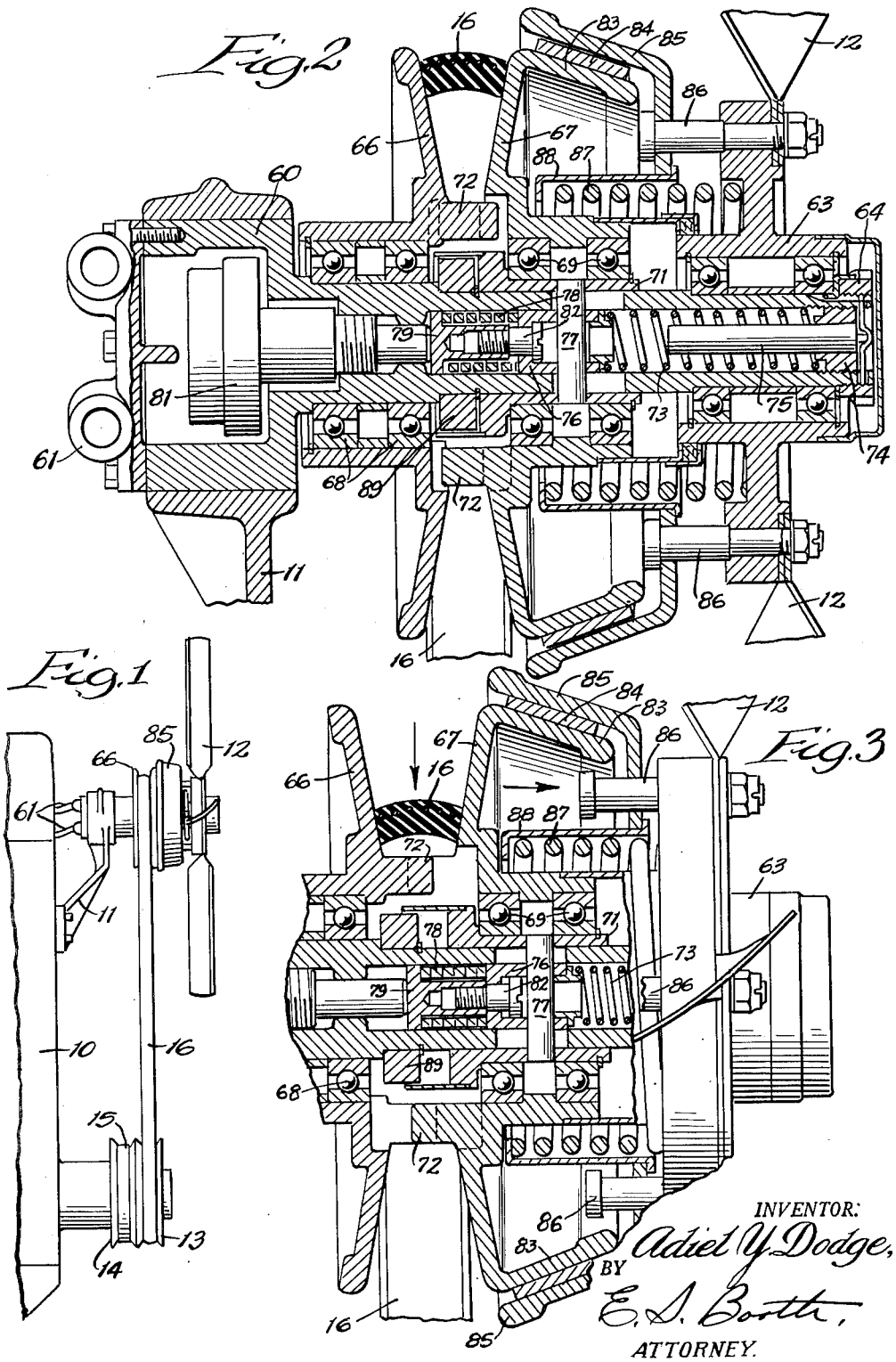

2,658,400

UNITED STATES PATENT OFFICE 2,658,400

VARIABLE FAN DRIVE

Adiel Y. Dodge, Rockford, Ill.

Application August 1, 1951, Serial No. 239,707

8 Claims. (Cl. 74—230.17)

This invention relates to variable fan drives and more particularly to variable speed belt drives for the cooling fans of internal combustion engines.

Various proposals have been made to disconnect the drive to the cooling fans of internal combustion engines when the engine temperature is low. While devices for this purpose operate satisfactorily under most conditions, they do not provide a complete solution to the problems encountered under all driving conditions such as in trucks and the like, where it is desired to maintain the engine temperature within fairly close limits for economy of operation.

It is accordingly an object of the present invention to provide a variable fan drive in which the fan driving ratio is varied through an infinite number of steps in accordance with engine temperature.

Another object is to provide a variable fan drive in which the fan drive ratio is varied by varying the effective diameter of a belt engaging pulley in response to the temperature of the engine.

According to one feature a thermostat is connected to a shiftable pulley member through a yielding connection so that the thermostat can continue to move after the pulley member has reached the limit of its movement.

Still another object is to provide a variable fan drive in which the driving connection to the fan is interrupted when the engine is below a predetermined low temperature.

According to another feature the fan is connected to its driving pulley by a clutch and snap action means are provided to cause a quick engagement and disengagement of the clutch with a minimum of slipping.

The above and other objects and features of the invention will be more readily apparent from the following description when read in connection with the accompanying drawing in which:

Figure 1 is a partial diagrammatic elevation of an engine equipped with a fan drive embodying the invention;

Figure 2 is an axial section through the variable pulley, and

Figure 3 is a partial section similar to Figure 2 showing the parts in a different position.

As shown in Figure 1, the variable drive of the invention is applied to a water cooled internal combustion engine indicated at 10. The engine has a bracket 11 secured to its front end on which a cooling fan 12 is rotatably supported to draw air through the usual radiator and over the engine to cool the engine. The fan may be driven by the engine through a drive pulley 13 mounted on an extension of the engine crankshaft projecting from the front of the engine. The pulley 13 is connected to a pulley 14 which is engaged by a belt 15 and in turn engages a driven sheave 14 which drives other accessories such as the water pump and generator. The pulley 13 is preferably a variable V pulley with its cone members urged together by a spring so that it tends to assume its maximum effective diameter but can yield to assume a smaller effective diameter under tension in belt 16.

The variable pulley on the fan shaft is best shown in Figures 2 and 3. In this construction a hollow fixed mounting member 60 is provided connected to the bracket 11 on the engine. The interior of the mounting member may be connected to the cooling jacket of the engine through tubes 61. The supporting member 60 rotatably supports the fan 12 which is mounted on a hub 63 at the outer end of the supporting member. The fan hub 63 is freely rotatable on the supporting member but is held against axial shifting thereon by means such as a locking ring 64.

The fan is adapted to be driven through the belt 16 which engages pulley members 66 and 67 of the conical V pulley type. The pulley member 66 is rotatably mounted on the supporting member on bearings 68 but is held against axial movement. The pulley member 67 is mounted for rotation on bearings 69 which are supported on a sleeve 71. The sleeve 71 is axially shiftable on the supporting member so that the pulley members can be moved axially relative to each other to vary the effective pulley diameter. Preferably the pulley members are formed at their inner ends with overlapping teeth 72 to connect them for rotation together and to prevent the belt from dropping between them.

The pulley member 67 is urged toward the member 66 partly by a spring 73 mounted in the supporting member 60 and seating at one end against a plug 74 in the supporting member and partly by a spring 87 referred to hereinafter. The plug 74 may also carry an oil wick 75 to insure lubrication of the centrally located parts.

At its opposite end the spring 73 seats against a block 76 which is slidable in the supporting member 60 and which is connected to the sleeve 71 by a pin 77 extending through elongated slots in the supporting member. The block 76 is connected through a compression spring 78 to a stem 79 of a thermostat 81 which is mounted in the hollow mounting member 60 to be subjected to engine temperature. When the bracket 11 is connected to the engine cooling jacket the thermostat 81 may lie in the cooling fluid for the engine to be accurately responsive to changes in engine temperature. The stem 79 carries a bolt 82 which fits loosely through an opening in the block 76 and has an enlarged head engaging the block 76. Normally, the parts occupy the position shown in Figure 2 to connect the block 76 to the thermostat to move therewith but upon excess expansion of the thermostat the spring 78 will compress as shown in Figure 3 to accommodate the excess movement and prevent damage to the parts. The preloaded force on the spring 78 is greater than the total force exerted by springs 73 and 87 when compressed so that for normal operation the spring acts as a rigid connection.

The pulley member 67 is adapted to be connected to the fan hub through a disengageable friction clutch. For this purpose the pulley member 67 is formed with a conical skirt 83 which may be lined on its outer surface with a friction material 84. The friction material is adapted to engage the conical inner surface of a clutch member 85 which is supported on pins 86 carried by the fan hub 73. A compression spring 87 acts between the fan hub and a sleeve 88 which is secured to the clutch member 85 and assists the spring 73 to urge the member 67 toward the member 66. Movement of the member 85 to the left is limited by stop means formed by enlarged heads on the pins 86. These stop means also make it possible to preload the spring 87.

When the engine temperature is low the parts will occupy the position shown in Figure 2 with the thermostat 81 contracted and the pulley member 67 shifted to the left by the springs 73 and 87. At this time the belt 65 lies adjacent the outer periphery of the pulley members and the friction material 84 is out of engagement with the clutch member 85. Thus the pulley can turn freely relative to the fan so that the fan will not be driven.

As the engine temperature increases the thermostat will expand and move the block 76 and sleeve 71 to the right to shift the pulley member 67 to the right. In order to provide a snap action for clutch engagement and disengagement, a magnet 89 is mounted on the supporting member to cooperate with the sleeve 71. The magnet will hold the sleeve 71 to the left until the thermostat force is sufficient to move the sleeve away from the magnet. Once the sleeve starts to move the magnetic force decreases rapidly so that the sleeve will be moved at least far enough to effect a rapid engagement of the clutch. Slipping is thus minimized.

As soon as the clutch is engaged the pulley will start driving the fan but at a relatively low speed due to the large diameter of the pulley. The driving force will, however, increase the tension in the belt 16 which will tend to move member 67 to the right thereby to further tighten the clutch engagement. This effect furthers the snap action effect of the magnet 89 to minimize slipping. As the temperature increases further the pulley member 67 will be moved further to the right to decrease further the effective diameter of the pulley and increase the fan speed. At maximum temperature the parts will occupy the position shown in Figure 3 with the belt 65 engaging the pulley members at their minimum diameter portions to provide maximum fan speed.

Warping of the belt and wear thereon are minimized by having the shiftable members of the driving and driven pulleys on opposite sides thereof. As shown the right hand member 67 of the upper variable pulley is shiftable so the left hand member of the lower pulley 13 will be made shiftable. This will maintain the working centers of both pulleys in the same plane as the belt as the effective pulley diameters change.

While one embodiment of the invention has been shown and described in detail, it will be understood that this is illustrative only and is not to be taken as a definition of the scope of the invention, reference being had for this purpose to the appended claims.

What is claimed is:

1. In a variable fan drive, a variable pulley including a pair of conical members having diverging faces and shiftable axially relative to each other to engage a belt, a spring urging the members relatively together to urge the belt toward the peripheries thereof, a thermostat expansible in response to temperature, means connecting the thermostat to the members to move them apart, a clutch to connect said pulley to a load, a spring normally to disengage the clutch, and a connection from the thermostat to the clutch to engage it when the thermostat expands.

2. In a variable fan drive, a variable pulley including a pair of conical members having diverging faces and shiftable axially relative to each other to engage a belt, a spring urging one member of the pulley toward the other member thereof, a thermostat expansible in response to temperature, means connecting the thermostat to said one member to move it away from the other member, and a clutch part engageable with said one member to connect it to a load, said one member being moved out of engagement with the clutch part by the spring when the thermostat is cold.

3. In a variable fan drive, a variable pulley comprising a pair of conical members having diverging faces to engage a belt and mounted for relative axial movement, means to move one of the members toward and away from the other, a clutch part mounted for axial movement adjacent to said one member, a spring urging the clutch part toward said one member, and stop means to limit movement of the clutch part toward said one member whereby when said one member is at its limit of movement in one direction it will disengage the clutch part and when it moves in the other direction it will engage the clutch part and the spring will yield to let the clutch part move with it.

4. In a variable fan drive, a variable pulley comprising a pair of conical members having diverging faces to engage a belt and mounted for relative axial movement, a spring urging one of the members toward the other, a thermostat expansible in response to temperature, a yielding connection between the thermostat and said one of the members to move it away from the other member, and a clutch part adjacent to said one of the members spaced therefrom when the member is moved the maximum distance toward the other member and drivably engaged thereby when said one member is moved away from the other member by the thermostat.

5. In a variable fan drive, a variable pulley comprising a pair of conical members having diverging faces to engage a belt and mounted for relative axial movement, a spring urging one of the members toward the other, a thermostat expansible in response to temperature, a yielding connection between the thermostat and said one of the members to move it away from the other member, and a clutch part adjacent to said one of the members spaced therefrom when the member is moved the maximum distance toward the other member and drivably engaged thereby when said one member is moved away from the other member by the thermostat, the clutch part being slidably mounted and urged toward said one member by a spring so that it will be moved with the member by the thermostat.

6. In a variable fan drive, a variable pulley including a pair of conical members having diverging faces and shiftable axially relative to each other to engage a belt, a first spring acting on one member of the pulley to urge it toward the other, a thermostat expansible in response to temperature, a clutch part engageable with said one member to connect it to a load, a second spring urging the clutch part toward said one member, stop means to limit movement of the clutch part toward said one member whereby the first spring will move said one member out of engagement with the clutch part, and means connecting the thermostat to said one member to move it toward the clutch part whereby as the thermostat is heated it will first move said one member against the first spring to engage the clutch and will thereafter move said one member against both the first and second springs to maintain the clutch in engagement and to vary the diameter of the pulley.

7. The construction of claim 6 in which the last named means includes a yieldable spring having a higher spring rate than the first and second springs combined.

8. In a variable fan drive, a variable pulley including a pair of conical members having diverging faces and shiftable axially relative to each other to engage a belt, spring means acting on one member of the pulley to urge it toward the other, a thermostat expansible in response to temperature, and a connection including a yieldable spring having a higher spring rate than said spring means between the thermostat and said one member of the pulley to move it away from the other member of the pulley and thereby to decrease the effective diameter of the pulley as the thermostat is heated, the last named spring yielding upon excess expansion of the thermostat to prevent damage to the thermostat.

ADIEL Y. DODGE.

References Cited in the file of this patent

UNITED STATES PATENTS

| Number | Name | Date |
|---|---|---|
| 2,045,870 | Paton | June 30, 1936 |
| 2,369,681 | Miles | Feb. 20, 1945 |
| 2,499,219 | Hemmeter | Feb. 28, 1950 |
| 2,499,224 | Lutz | Feb. 28, 1950 |
| 2,516,269 | Starkey | July 20, 1950 |
| 2,521,457 | Heyer | Sept. 5, 1950 |
| 2,529,743 | Salsbury | Nov. 14, 1950 |

FOREIGN PATENTS

| Number | Country | Date |
|---|---|---|
| 624,546 | Great Britain | July 10, 1949 |